United States Patent [19]

Plochocka et al.

[11] Patent Number: 5,147,963
[45] Date of Patent: Sep. 15, 1992

[54] PROCESS FOR THE PRODUCTION OF AMORPHOUS METHYL VINYL ETHER HOMOPOLYMERS HAVING A HIGH MOLECULAR WEIGHT AND NARROW MOLECULAR WEIGHT DISTRIBUTION

[75] Inventors: Krystyna Plochocka, Scotch Plains; Mohammed Tazi, Wayne, both of N.J.

[73] Assignee: ISP Investments Inc., Wilmington, Del.

[21] Appl. No.: 422,322

[22] Filed: Oct. 16, 1989

[51] Int. Cl.$^5$ .................................. C08F 116/14
[52] U.S. Cl. ........................................ 526/332
[58] Field of Search ............................ 526/332

[56] References Cited

U.S. PATENT DOCUMENTS 3,332,924  7/1967  Van de Castle et al. ........... 526/238
4,948,848  8/1990  Tazi et al. .......................... 526/332

Primary Examiner—Paul R. Michl
Assistant Examiner—Tae H. Yoon
Attorney, Agent, or Firm—Walter Katz; Marilyn J. Maue; Joshua J. Ward

[57] ABSTRACT

What is described herein is a cationic polymerization process for the production of methyl vinyl ether homopolymers which have a relatively high molecular weight and a rather narrow molecular weight distribution. Polymerization is carried out under pressure of an added inert gas so the methyl vinyl ether vapor is effectively absorbed into the liquid phase during the polymerization.

18 Claims, No Drawings

PROCESS FOR THE PRODUCTION OF AMORPHOUS METHYL VINYL ETHER HOMOPOLYMERS HAVING A HIGH MOLECULAR WEIGHT AND NARROW MOLECULAR WEIGHT DISTRIBUTION

BACKGROUND OF THE INVENTION

1. Field of the Invention

This invention relates to polymers of methyl vinyl ether, and, more particularly, to a process for the production of amorphous polymers of methyl vinyl ether which have a relatively high molecular weight and narrow molecular weight distribution.

2. Description of the Prior Art

The polymerization of alkyl vinyl ethers to form amorphous homopolymers is well known; see U.S. Pat. Nos. 2,104,000; 2,653,923; 2,799,669; 2,984,656; 3,017,260; 3,022,280; 3,023,198; 3,047,555; 3,080,352; and 3,332,924; C. E. Schildknecht *Vinyl and Related Polymers* (Wiley, 1952) page 602, and German Patent No. 2062213 (6/22/78).

Despite the availability of several commercial and laboratory processes for the production of alkyl vinyl ether homopolymers, there is still a need for improved processes which can provide high quality methyl vinyl ether homopolymers of predetermined molecular weight. However, methyl vinyl ether has a boiling point of only 5.5° C., which is below room temperature, and therefore it is difficult to handle. Furthermore, methyl vinyl ether does not readily form homopolymers having high molecular weights and/or a narrow molecular weight distribution. Accordingly, it has been necessary to use very low operating temperatures, e.g. −40° to −80° C., for controlled cationic polymerization of Attempts to operate at temperatures in the vicinity of from 0° C. to room temperature have not been very successful because of the difficulty of obtaining polymers with molecular weights sufficient for practical applications, such as adhesive compositions.

Accordingly, an object of this invention is to provide a novel and practical process for the production of amorphous homopolymers of methyl vinyl ether.

Another object of this invention is to provide an improved process for making methyl vinyl ether homopolymers which have relatively high molecular weights and a narrow molecular weight distribution.

Still another object herein is to provide a process which is carried out in the vicinity of room temperature.

Yet another object is to provide a process for making methyl vinyl ether polymers without the use of objectionable solvents.

A further object herein is to provide a batch process for the cationic polymerization of methyl vinyl ether monomer under practical reaction conditions, and, particularly, where the reaction exotherm can be readily controlled even at rapid reaction rates.

Among the other objects of the invention is to provide a methyl vinyl ether polymerization product in the form of a viscous, concentrated solution of amorphous polymeric methyl vinyl ether, in substantially residual methyl vinyl ether monomer as solvent, and wherein the polymer has a weight average molecular weight, $\overline{MW}_w$, above 110,000, preferably up to about 200,000, a number average molecular weight, $\overline{MW}_n$, of above 60,000, preferably up to about 100,000, with a molecular weight distribution, $\overline{MW}_w, \overline{MW}_n$, of less than 2.0.

These and other objects and features of the invention will be made apparent from the following more particular description of the invention.

SUMMARY OF THE INVENTION

What is described herein is a cationic polymerization process for the production of methyl vinyl ether homopolymers which have a relatively high molecular weight, and which are characterized by a rather narrow molecular weight distribution. Polymerization is carried out under pressure of an added inert gas so that methyl vinyl ether vapor is effectively absorbed into the liquid phase during the polymerization.

In the preferred form of the invention, the added inert gas is nitrogen, the polymerization temperature is about −20° to 50° C., preferably about −5° to 25° C.; the nitrogen pressure is about 20 to 100 psi, preferably about 50 to 80 psi; polymerization is conducted in the substantial absence of a solvent for the monomer reactant, and both the initiator and monomer are fed into the reactor in parallel during the reaction period.

DETAILED DESCRIPTION OF THE INVENTION

In accordance with the present invention, amorphous, high molecular polymers of methyl vinyl ether are prepared by polymerizing the monomer at a polymerization temperature of about −20° to about 50° C. and at a pressure of about 20 to about 100 psi of an added inert gas. The methyl vinyl ether thus is absorbed into the liquid phase during the polymerization. The added inert gas usually is nitrogen, although argon, $CO_2$, and the like, may be used as well.

The novel and practical process of the invention uses commercially available methyl vinyl ether monomer which is dried before use, e.g. by passing the liquid or its vapors through KOH pellets and condensing the treated monomer vapors.

Suitable cationic polymerization initiators for use in the process are selected from among any of the known Lewis acid initiators, particularly $BF_3$ gas or a $BF_3$ complex, such as an etherate. A preferred initiator is the $BF_3$.diethyl ether complex.

In this invention, polymerization may be carried out without the use of solvents for either the monomer or initiator. However, the small quantities of initiator used in the polymerization can be fed into the reactor vessel more conveniently as a solution of the initiator in a minimum amount of an inert and anhydrous solvent, as for example, a non-toxic aliphatic or aromatic hydrocarbon, such as an aromatic hydrocarbon, e.g. toluene; or an ether, e.g. ethyl ether. The liquid monomer, on the other hand, can be introduced effectively without any solvent.

The added inert gas, which provides the desired pressure condition in the polymerization process of the invention, may be provided from such inert gases as nitrogen, argon or $CO_2$. Nitrogen is preferred.

The polymerization reaction may be carried out on a laboratory scale in a small glass or stainless steel pressure reactor which is provided with agitation means, such as an anchor type stirrer capable of rotating at about 100–300 rpm. The reactor preferably is jacketed for cooling by a cooling liquid such as an ethylene glycol-water mixture, or a saturated aqueous NaCl solution. A reactor temperature of as low as about −20° C. is conveniently achieved in this manner.

In operation, the reactor first is purged of air with dry nitrogen gas, evacuated, and then filled with the inert nitrogen gas to the desired pressure of about 20 to 100 psi, preferably about 50 to 80 psi.

A predetermined amount of liquid methyl vinyl ether monomer then is precharged into the reactor to enable stirring to take place within the well of the reactor. Suitably up to about one-half of the total amount of monomer to be used in the polymerization may be precharged in the reactor.

The remaining quantity of monomer, which is chilled to about −20° to 0° C., and the initiator solution, then are fed into the reactor, preferably in parallel, during the course of the polymerization, and polymerization is effected under the predetermined temperature and pressure conditions described above.

The polymerization mixture suitably contains about 10 to 100 mole percent of the monomeric methyl vinyl ether and about 0.001 to 0.1%, preferably about 0.03%, of the initiator, by weight of the monomer.

Typically the $BF_3$.diethyl ether complex initiator is introduced as solution in anhydrous toluene. The amount of initiator in toluene solution corresponds to about 0.005 to 0.030 mole % of the methyl vinyl ether, preferably about 0.015 mole %. A total of 250 ml MVE is used in the reaction. The feeding time is about 100 minutes, suitably about 15 to 600 minutes, and the total reaction time is about 4 hours, suitably about ¼–24 hours. The toluene level in the reaction mixture is about 5 vol. % or less.

After an induction period, e.g. about 20 to 60 minutes, polymerization begins, as evidenced by a rapid evolution of heat. The reaction rate is rapid and the polymerization requires only about 1 to 10 hours, generally about 4–6 hours. The progress of the reaction is followed by observing the increasing viscosity of the reaction mixture and by the decreasing evolution of heat. Preferably, polymerization of reactant monomer into polymer is less than complete so that residual monomer liquid can function as an in situ solvent for the homopolymer. Generally polymerization is carried forward to about a 40 to 90% conversion, and, usually, only to about 50 to 60%.

At the end of the reaction, unreacted monomer is evaporated. The remaining polymer can be isolated as a semi-solid, gum like material, or it can be diluted with a suitable solvent, e.g. a hydrocarbon solvent, particularly toluene, or water or an alcohol.

In another embodiment of the invention, polymerization is performed substantially without solvent up to a monomer conversion of about 50%–70%, at which point an inert, chilled solvent is gradually added and polymerization is continued. Addition of solvent at the final stage of polymerization makes the thick, viscous reaction mixture more easily agitated.

The invention will now be described by reference to the following examples.

EXAMPLE 1

A one-liter glass pressure reactor equipped with two inlet tubes, agitation means and jacketed cooling was purged of air with nitrogen, evacuated and pressurized with dry nitrogen. The $N_2$ pressure was 64 psi. The reactor then was precharged with 125 ml of methyl vinyl ether which had been dried over KOH pellets. The reactor then was cooled by circulation of a cooling mixture to a temperature of about −1° C.

An initiator solution of $BF_3$.diethyl etherate, 0.07 g., was prepared in 25 ml anhydrous toluene, which corresponds to 0.015 mole % of methyl vinyl ether reactant. The initiator solution and 125 ml of liquid methyl vinyl ether (without solvent) cooled to about −10° C. were fed into the reactor through the two inlet tubes in separate, parallel feed streams during a feeding time of 100 minutes.

Polymerization was monitored by recording temperature, pressure and torque changes with time. During the reaction, the temperature of the reaction mixture gradually increased to about 10° C., and the torque increased from an initial value of 9 N.cm to 49 N.cm. After 240 minutes, polymerization was terminated by adding 5 ml of a 10% solution of $CH_3OH$—$NH_4OH$.

The polymer product was a viscous, highly concentrated solution of methyl vinyl ether polymer substantially in residual, unreacted methyl vinyl ether. The product also contained a minimum amount of toluene (from the initiator solution). The solution then was diluted with 200 ml of toluene, residual methyl vinyl ether was removed and the polymer solution was discharged.

The conversion of monomer to polymer was 54%. The weight average molecular weight of polymer was 149,000; the number average molecular weight was 80,000; and the molecular weight distribution was 1.86.

EXAMPLE 2

The process of Example 1 was repeated using a reaction time of 480 minutes. The conversion was 71%. The weight average molecular weight was 185,000; the number average molecular weight was 105,000 and the molecular weight distribution was 1.77.

EXAMPLE 3

The process of Example 1 was repeated at a $N_2$ pressure of 74 psi, a reaction time of 370 minutes and a conversion of 88%. The weight average molecular weight was 166,000; the number average molecular weight was 92,600; and the molecular weight distribution was 1.79.

EXAMPLE 4

The process of Example 1 was repeated at a $N_2$ pressure of 64 psi. After 100 minutes, during which time all of the methyl vinyl ether reactant and the initiator solution was fed in, the reaction mixture was held at a temperature at 12°–14° C. for 110 minutes. The torque of the reaction mixture increased during this period from about 12 N.cm to about 48 N.cm, indicating significant increase of viscosity. Then 50 ml anhydrous toluene was fed in over 30 minutes and the reaction was stopped. Conversion of methyl vinyl ether was about 58%. The polymer had a weight average molecular weight of 146,000, a number average molecular weight of 78,000, and a molecular weight distribution of 1.91.

COMPARATIVE EXAMPLE

The process of Example 1 was repeated without nitrogen pressure and with precharging of all monomer reactant. The copolymer obtained had a weight average molecular weight of only 106,000, a number average molecular weight of only 59,000, and a molecular weight distribution of 1.80.

What is claimed is:

1. A process for the production of homopolymers of methyl vinyl ether wherein the polymer product has a weight average molecular weight, $\overline{MW}_w$, above 110,000 and up to 200,000, a number average molecular weight, $\overline{MW}_n$, of above 60,000 and up to about 100,000, with a molecular weight distribution, $\overline{MW}_w/\overline{MW}_n$, of less than 2.0 by cationic polymerizaiton of methyl vinyl ether monomer in the presence of a cationic polymerization initiator which comprises:

carrying out the homopolymerization at a temperature of about $-20°$ to $50°$ C. under the pressure of an added inert gas of about 20 to 100 psi such that the methyl vinyl ether vapor is effectively absorbed into the liquid phase during the polymerization, in the substantial absence of a solvent for methyl vinyl ether other than the minimum amount of solvent for the initiator, which homopolymerization is carried forward to about a 50 to 90% conversion of monomer into homopolymer thereby allowing residual monomer to function as an in situ solvent for the formed homopolymer product which is a viscous, concentrated solution of amorphous methyl vinyl ether homopolymer in substantially residual methyl vinyl ether.

2. A process according to claim 1 wherein the added inert gas is nitrogen, argon or carbon dioxide.

3. A process according to claim 2 wherein said temperature is about $-5°$ to $25°$ C., and said pressure is about 50 to 80 psi.

4. A process according to claim 1 wherein a minimum amount of toluene is used to provide an initiator solution.

5. A process according to claim 2 wherein said added inert gas is nitrogen.

6. A process according to claim 1 wherein methyl vinyl ether and initiator solution are fed in parallel into a pressure reactor to effect polymerization over a predetermined reaction time.

7. A process according to claim 6 which is a batch process.

8. A process according to claim 7 wherein said polymerization reaction time is about 1 to 10 hours.

9. A process according to claim 8 wherein said reaction time is about 4 to 6 hours.

10. A process according to claim 1 wherein said initiator is $BF_3$ gas or a $BF_3$ complex.

11. A process according to claim 6 wherein said initiator is fed into the reactor in a minimum amount of toluene.

12. A process according to claim 11 wherein the reactor is precharged with a portion of the methyl vinyl ether.

13. A process according to claim 10 wherein said initiator is a solution in a minimum amount of toluene.

14. A process according to claim 1 wherein the polymer is recovered by removing residual monomer and diluting with a hydrocarbon, water or alcohol.

15. A process according to claim 1 wherein chilled toluene is fed into the reactor during the latter stages of the polymerization.

16. A process according to claim 6 wherein methyl vinyl ether is chilled before being fed into the reactor.

17. A process according to claim 1 wherein said initiator is $BF_3$ diethyl etherate.

18. A process according to claim 16 wherein methyl vinyl ether is chilled to about $-20°$ to $0°$ C. before being fed in parallel with the initiator into the reactor.

* * * * *